United States Patent

[11] 3,585,288

[72] Inventor John G. Benjamin
Minneapolis, Minn.

[21] Appl. No. 833,488
[22] Filed June 16, 1969
[45] Patented June 15, 1971
[73] Assignee Minnesota Mining and Manufacturing Company
St. Paul, Minn.
Continuation-in-part of application Ser. No. 672,663, Aug. 8, 1967, now Patent No. 3,452,981, which is a division of application Ser. No. 459,695, May 28, 1965, now Patent No. 3,358,554.

[54] PROJECTION APPARATUS FOR USE IN AN IMAGE TRANSDUCING SYSTEM
1 Claim, 4 Drawing Figs.

[52] U.S. Cl. .......... 178/7.85, 178/7.6
[51] Int. Cl. .......... H04n 3/00
[50] Field of Search .......... 178/7.6, 7.85; 350/167, 38; 235/61.11

[56] References Cited

UNITED STATES PATENTS

| | | | |
|---|---|---|---|
| 3,437,796 | 4/1969 | Lapornik | 350/38 X |
| 2,627,199 | 2/1953 | O'Brien | 350/167 |
| 2,622,147 | 12/1952 | Condiffe et al. | 178/7.6 |
| 3,047,871 | 7/1962 | Hider et al. | 178/7.85 |

*Primary Examiner*—Richard Murray
*Attorney*—Kinney, Alexander, Sell, Steldt and DeLaHunt

ABSTRACT: A projection apparatus for use in an image transducing system for projecting a substantially linear region, such as a line of indicia, from a display area to a target area of an incremental sensing device such as a vidicon tube, or of a source of illuminating radiation such as a cathode-ray tube, wherein only a segment of the line of indicia is instantaneously imaged at the target area, but is imaged to optimumly cover the target area, and wherein a mirror is disposed to rotate to scan across the display area to vary over a period of time the segment which is instantaneously provided at the target area in order to display the entire linear region across the target area over the period of time.

PATENTED JUN 15 1971 3,585,288

INVENTOR.
JOHN G. BENJAMIN
BY Kinney, Alexander, Sell, Steldt & DeLaHunt
ATTORNEYS

PROJECTION APPARATUS FOR USE IN AN IMAGE TRANSDUCING SYSTEM

CROSS REFERENCE

This is a continuation-in-part of my copending application, Ser. No. 672,663, now U.S. Pat. No. 3,452,981, filed Aug. 8, 1967, which was then a copending divisional application of my application, Ser. No. 459,695, filed May 28, 1965, now U.S. Pat. No. 3,358,554.

BACKGROUND OF THE INVENTION

The present invention generally relates to an image transducing system and specifically to an apparatus for projecting an image of a region from a display area to the target area of an incremental sensing device.

In a typical image transducing system, such as that used in character recognition systems, an image of a region is projected from a display area to the target area of an incremental sensing device, such as a vidicon camera tube. The image is transduced from electrical to optical representations by electron beam scanning action produced in the vidicon camera tube. A limitation upon the utility of this type of character recognition system when used to transduce an image of a substantially linear region, such as a line of indicia, is that of being able to obtain only limited scanning resolution when imaging a region having substantial length in relation to the width or diameter of the incremental sensing device, such a vidicon tube. The prior art method of increasing the scanning resolution of an image of a substantially linear region has been to increase the ratio of the size of the target area to the increment of sensing by the scanning beam. This ratio may be increased by increasing the size of the photosensitive face of the vidicon camera tube or by decreasing the size of the scanning beam, either or both of which in turn appreciably increases the cost of the image transducing system. A large photosensitive vidicon face inherently limits frequency response and scanning rates. Reducing the size of the scanning beam increases the quality and precision manufacturing requirements for the electron gun, the photosensitive face and the scanning and focusing components of the vidicon; and such reduction also either decreases the signal to noise ratio or, if the beam intensity is increased to maintain the signal to noise ratio, decreases the reliability of the beam target region.

SUMMARY OF THE INVENTION

For use in an image transducing system, I provide an apparatus for projecting an image of a region from a display area to the target area of an incremental sensing device, which apparatus instantaneously images across the target area only a segment of the image appearing at the display area. The segment is instantaneously provided by an optical system of lenses and mirrors disposed adjacent the display area and the target area for controlling the size, focus, and position of the image. By instantaneously imaging across the target area only a segment which optimumly cover the target area rather than the full image appearing at the display area, the size of that segment imaged across the target area can be increased, thereby providing better scanning resolution without either increasing the size of the target area or decreasing the increment of sensing by the scanning beam.

In the preferred embodiment, provision is made for varying a period of time the disposition of the optical system between the display area and target area in order to scan across the display area to vary the segment of the display area which is instantaneously imaged across the target area. Over a period of time the entire region is thereby imaged across the target area.

Means for monitoring the image appearing in the display area are also provided.

DESCRIPTION OF THE PREFERRED EMBODIMENTS

My invention is particularly applicable to an image transducing system in which indicia on sheet material are automatically recognized by a suitable incremental sensing device for character recognition.

An apparatus for handling sheet material which is capable of feeding sheet material containing lines of indicia to a display area is described in my U.S. Pat. Nos. 3,358,554 and 3,430,952 and in my above referenced copending U.S. Pat. application Ser. No., now U.S. Pat. No. 3,452,981.

Figure 1:
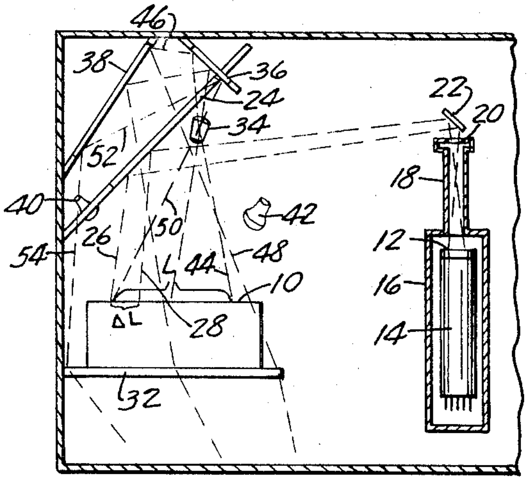
FIG. 1 is a partially schematic sectional top view of the projecting apparatus of the present invention.

I have schematically shown in FIG. 1 an apparatus for projecting an image of a region from a display area 10 to the target area 12 of an incremental sensing device 14, such as a conventional vidicon camera tube. Other image pickup devices such as the image orthicon, image dissector, iconoscope, photocell strip or matrix might also be used in various circumstances in place of the vidicon. Only the side of the plane of the display area 10 is viewed in FIG. 1. The target area is the vidicon photosensitive target plate 12 upon which is produced a charge image that is scanned by an electron beam from a gun within the vidicon. The vidicon 14 is housed within a light-tight housing 16 having a lens barrel 18 with a front lens element 20.

In converting an image to an electrical signal sequence by scanning, a vidicon provides better resolution if a relatively small segment of the image appearing at the display area is imaged across the target plate 12 for subsequent scanning. It is accordingly contemplated that at least one relatively short segment, ΔL, of each line of indicia to be scanned will be imaged at any one time across the target plate 12 and the ΔL image on the target plate 12 will be shifted along the line as the scanning operation progresses.

In order to accomplish this, I provide an optical system schematically shown as cooperating mirrors 22 and 24. This optical system, while shown as only single mirrors 22 and 24, actually is a composite lens, mirror and/or prism arrangement for selectively focusing, sizing and positioning images from the display area 10 to the target area 12. As indicated in FIG. 1, the ΔL segment being made available on the target plate 12 for scanning at any one time corresponds to the segment between image edge rays 26 and 28. These rays are reflected off mirror 24, thence off mirror 22, thence passing through lens 20 to form an image across the photosensitive target plate 12.

Figure 2:
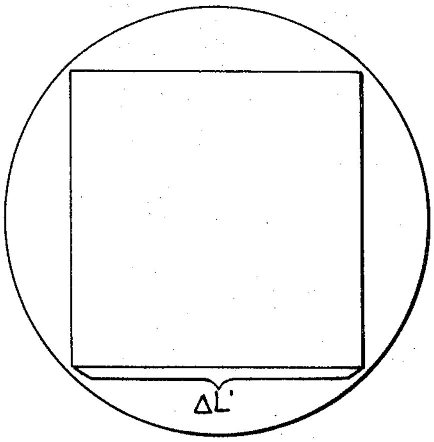
FIG. 2 is an illustration of the target area of FIG. 1 containing a ΔL segment of an image appearing at the display area of FIG. 1.

In the preferred embodiment, a single mirror 22 is rotated about an axis at right angles to the plane of the display area 10 to scan the display area 10 so that the segment ΔL of the line between the image edge rays 26 and 28, which is instantaneously imaged, gradually moves along the line to image across the target plate 12, a segment ΔL′ of the image appearing at the display area 10 (see FIG. 2). Thus, over a period of time, all ΔL portions of the entire line length L are imaged across the target area 12 for scanning.

Figure 3:
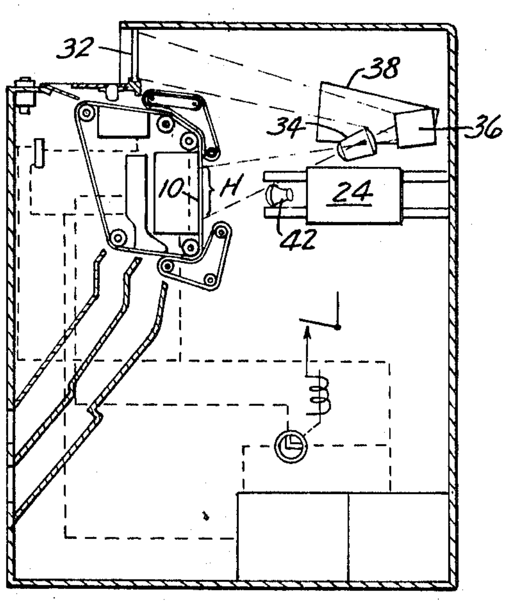
FIG. 3 is a partially schematic sectional side view of an apparatus for handling sheet material at a display area adjacent the projection apparatus shown in FIG. 1. The projection apparatus of FIG. 1 is also partially shown therein.
Figure 4:
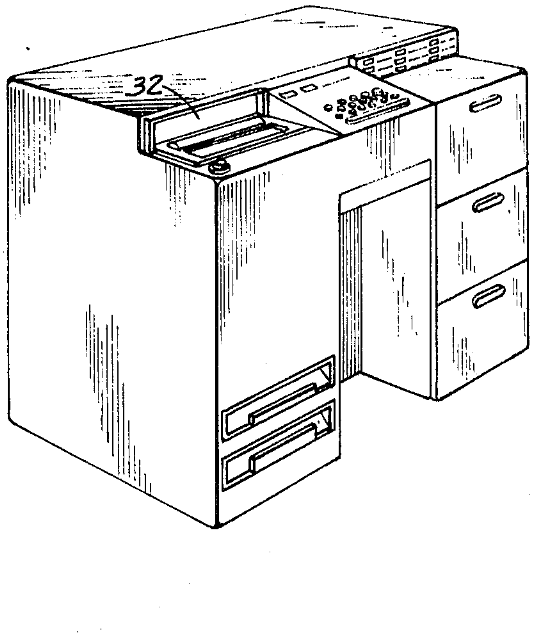
FIG. 4 is a perspective view of a cabinet for containing the sheet feeding apparatus of FIG. 3, which shows the operator's viewing screen which is also shown in FIGS. 1 and 3.

In order for an operator to monitor the display area 10, I provide means for projecting onto a screen 32 the line and the immediately adjacent lines of indicia on the printed sheet which is at the display area 10 at any given moment. Referring to FIG. 3, the display area 10 has a height H. A side view of the plane of the display area 10 is also shown in FIG. 3. The monitor projection means include a lens 34 and a plurality of mirrors 36 and 38. The means for supporting the mirrors 36 and 38 are not shown. It is to be understood that any suitable means can be employed for mounting these mirrors so that the reflecting surfaces are free and that no obstruction exists in the optical path. A pair of lamps 40 and 42 provide the illumination of that portion of the indicia passing over the display area 10 which is to be projected onto the screen 32. These lamps 40 and 42 can be supported in any suitable manner. In FIG. 1, I have shown somewhat schematically the relationship between the screen 32 (also shown in FIG. 4) and the flat wholly exposed face of the display area 10 within which region the information on the sheet material is viewed. Referring to the various optical ray lines shown therein, it will be noted that light from the right-hand side of the material being observed passes, as shown by ray line 44, through the lens 34 striking the mirror 36 closely adjacent the left-hand side of the reflecting surface. As shown by ray line 46, the sare ray is reflected onto the right-hand portion of the reflecting surface of mirror 38 and is reflected from there, as shown by ray line 48, onto the right-hand side of the viewing screen 32. Similarly, as indicated by the ray lines 50, 52 and 54, the image rays from the left-hand side of the portion being viewed as it passes over the display area 10 are transmitted through lens 34 engaging the reflective surface 36 adjacent its right-hand edge, are reflected off the left-hand edge of mirror 38 and are projected onto the viewing screen 32 to form an image at its left-hand side. It will furthermore be noted, from a comparison of the relative size of the original image region being viewed as it passes over the display area 10 and of the image formed between rays 48 and 54 on the screen 32, that the image of the region of display area 10 is enlarged as it appears on the screen 32. This enables an operator to read the indicia appearing in the display area 10 thereon even though they are relatively small and to readily observe the portion of the material passing the display area 10 so that in case of any malfunction, the operator is able to observe the general area at which the malfunction occurs.

While the sheet material is passing the display area 10, it is operated on in any desired manner. For example, if the image transducing system is a photographic device, the display area may be photographed at the operator's discretion. In the particular embodiment shown, wherein the image transducing system is used for character recognition, when there are indicia on the sheet material, such is scanned and fed to a logic mechanism (not shown) which automatically detects the position of the indicia and reads the indicia.

The projection apparatus of the present invention may be used in a bidirectional system. In a facsimile reproducing system, an electrical signal containing information produces an image across the target area 12, which thereby produces in the display area 10 the same information for viewing or reproduction, such as by photographing the display area 10. The reverse of this procedure is used in extracting the electrical facsimile signal from an original document located at the display area 10.

In other transducing system applications, the target area 12 may be the source of illuminating radiation from a flying spot scanner device, such as a Nipkow Disc, a cathode-ray tube, a laser beam scanner, etc., which would project a fine beam of radiation through the optical system of this invention to strike the material at the display area 10 and thence reflect from the display area 10 with an intensity representative of the light or dark regions of the intelligence or indicia contained thereon, which intensity is thence sensed by one or more photomultiplier tubes, photo diodes, phototransistors, or the like located in the position of lamp 42.

I claim:

1. An image projecting apparatus for use in an image transducing system, wherein an image of a substantially linear region, such as a line of indicia, having a length L is projected from a display area to a target area of an incremental sensing device such as a vidicon tube, or of a source of illuminating radiation such as a cathode-ray tube, wherein within said system the display area corresponding to the linear region has a length to width ratio substantially greater than the length to width ratio of the target area, which image projecting apparatus comprises an optical system of lenses and mirrors disposed adjacent the display area and the target area for controlling the size, focus and position of the projected image, characterized by the feature that said optical system is disposed to provide at the target area an image optimumly covering the target area which is at any one time a relatively short segment $\Delta L$ of the image at the display area, wherein said optical system includes a mirror which is rotatable to scan across the display area to vary over a period of time the segment $\Delta L$ being instantaneously provided at the target area in order to display the entire region across the target area over the period of time.

UNITED STATES PATENT OFFICE
CERTIFICATE OF CORRECTION

Patent No. 3,585,288 Dated June 15, 1971

Inventor(s) John G. Benjamin

It is certified that error appears in the above-identified patent and that said Letters Patent are hereby corrected as shown below:

Column 1, line 58, change "cover" to -- covers --; and
line 65, before "a" insert -- over --.
Column 2, line 22, after "No." insert --672,663 --; and
line 63, after "appearing" (first occurrence) delete "appearing".
Column 3, line 15, change "sare to -- same --.

Signed and sealed this 30th day of May 1972.

(SEAL)
Attest:

EDWARD M.FLETCHER, JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334